US012776615B1

(12) United States Patent
Cohen et al.

(10) Patent No.: US 12,776,615 B1
(45) Date of Patent: Oct. 27, 2026

(54) CAVITY DUMPER CONFIGURED WITH AN OPTICAL ENHANCEMENT CAVITY

(71) Applicant: Blue Laser Fusion, Inc., Palo Alto, CA (US)

(72) Inventors: Trevor Cohen, Palo Alto, CA (US); Shuji Nakamura, Palo Alto, CA (US); Charles Smith, Palo Alto, CA (US); Nathan Svadlenak, Palo Alto, CA (US)

(73) Assignee: Blue Laser Fusion, Inc., Palo Alto, CA (US)

( * ) Notice: Subject to any disclaimer, the term of this patent is extended or adjusted under 35 U.S.C. 154(b) by 292 days.

(21) Appl. No.: 18/433,070

(22) Filed: Feb. 5, 2024

(51) Int. Cl.

| | |
|---|---|
| ***H01S 3/10*** | (2006.01) |
| ***H01S 3/034*** | (2006.01) |
| ***H01S 3/094*** | (2006.01) |
| *G21B 1/03* | (2006.01) |
| *G21B 1/19* | (2006.01) |
| *G21B 1/23* | (2006.01) |

(52) U.S. Cl.
CPC ................ *H01S 3/10* (2013.01); *H01S 3/034* (2013.01); *H01S 3/094038* (2013.01); *H01S 3/094076* (2013.01); *G21B 1/03* (2013.01); *G21B 1/19* (2013.01); *G21B 1/23* (2013.01)

(58) Field of Classification Search
CPC ...... H01S 3/10; H01S 3/034; H01S 3/094038; H01S 3/094076
See application file for complete search history.

(56) References Cited

U.S. PATENT DOCUMENTS

| | | | |
|---|---|---|---|
| 5,168,400 | A | 12/1992 | Moses |
| 8,208,508 | B2 | 6/2012 | Deri et al. |

(Continued)

FOREIGN PATENT DOCUMENTS

| | | | |
|---|---|---|---|
| WO | 2011029031 | A1 | 3/2011 |
| WO | 2012064767 | A1 | 5/2012 |

(Continued)

OTHER PUBLICATIONS

Peter Russbueldt et al., "Innoslab Amplifiers", IEEE Journal of Selected Topics in Quantum Electronics, Jan./Feb. 2015, vol. 21, No. 1, pp. 447-463, Art No. 3100117, doi: 10.1109/JSTQE.2014.2333234.

(Continued)

*Primary Examiner* — Yuanda Zhang
(74) *Attorney, Agent, or Firm* — Ogawa P.C.

(57) ABSTRACT

A laser system comprising an optical enhancement cavity is provided. The optical enhancement cavity has a length and a pair of mirror devices facing each other to define a cavity region. A laser device is coupled to one of the mirror devices to cause propagating of a pulse laser beam between the mirror devices such that the propagating pulse laser beam increases in intensity as the pulse laser beam circulates and resonates within the cavity region. A support structure is coupled to each of the mirror devices to cause the length of the cavity to suspend in a pendulum like structure. A spatial driver device is coupled to an end of the cavity to cause one of the mirror devices to move from a first location to a second location, thereby causing the propagating laser beam to be dumped to an external path from the cavity region.

16 Claims, 11 Drawing Sheets

(56) References Cited

U.S. PATENT DOCUMENTS

| | | | | |
|---|---|---|---|---|
| 9,171,646 | B2 | 10/2015 | Moses et al. | |
| 10,410,752 | B2 | 9/2019 | Hora | |
| 10,476,226 | B2 | 11/2019 | Bayramian et al. | |
| 10,660,192 | B2 | 5/2020 | Campbell et al. | |
| 11,387,007 | B2 | 7/2022 | Moses et al. | |
| 11,784,454 | B1 * | 10/2023 | Nakamura | H02N 2/028 372/92 |
| 12,160,082 | B1 * | 12/2024 | Nakamura | H01S 5/0071 |
| 2003/0002610 | A1 | 1/2003 | Panarella | |
| 2009/0000268 | A1 | 1/2009 | Yurash | |
| 2011/0235669 | A1 | 9/2011 | Deri et al. | |
| 2011/0261919 | A1 | 10/2011 | Sefcik et al. | |
| 2013/0064340 | A1 | 3/2013 | Latkowski et al. | |
| 2014/0138359 | A1 | 5/2014 | Carr et al. | |
| 2014/0348283 | A1 | 11/2014 | Perkins et al. | |
| 2015/0153563 | A1 * | 6/2015 | Kamal | B81C 1/00317 359/578 |
| 2018/0211732 | A1 | 7/2018 | Perkins | |
| 2018/0286631 | A1 * | 10/2018 | Axelrod | H01J 37/04 |
| 2024/0158106 | A1 * | 5/2024 | Nakamura | B64G 1/105 |
| 2024/0387062 | A1 * | 11/2024 | Nakamura | G21B 1/19 |

FOREIGN PATENT DOCUMENTS

| | | | |
|---|---|---|---|
| WO | 2013070683 | A1 | 5/2013 |
| WO | 2013133885 | A1 | 9/2013 |
| WO | 2013165469 | A2 | 11/2013 |
| WO | 2014113100 | A2 | 7/2014 |
| WO | 2014130127 | A2 | 8/2014 |
| WO | 2014160128 | A1 | 10/2014 |
| WO | 2015021403 | A1 | 2/2015 |

OTHER PUBLICATIONS

Y. Hosaka et al., “Mode-locked pulse oscillation of a self-resonating enhancement optical cavity” Journal of Physics: Conference Series. 1350. 10.1088/1742-6596/1350/1/012028, 4 pgs., Oct. 2016.

* cited by examiner

CAVITY DUMPER CONFIGURED WITH AN OPTICAL ENHANCEMENT CAVITY

BACKGROUND OF INVENTION

The present invention relates generally to fusion energy generation techniques. In particular, the present invention provides a laser system and method for fusion energy, related methods, and more particularly techniques for dumping the laser from a cavity region. Merely by way of example, the invention can be applied to a variety of applications, including energy generation for power, spaceships, travel, other vehicles for air, land, and water, defense applications (e.g., satellite, aerospace, land and missile defense, submarines, boats), biotechnology, chemical, mechanical, electrical, and communication and/or data applications.

From the beginning of time, human beings have developed energy sources from natural materials such as wood, coal, oil, and gas products. Unfortunately, burning wood and coal leads to major pollution issues, including adding undesirable carbon particles into the atmosphere. Oil and gas products also have similar limitations and have been a leading cause of "global warming." Renewable energy sources including nuclear, wind, hydroelectric, and solar are promising. However, such renewable energy sources have other shortcomings. Wind only works if the wind is blowing. Solar cannot be used when the sun goes down. Hydroelectric is limited to areas with water, and nuclear, although promising, has had major problems in generating waste and unreliable and dangerous reactors. One other promising energy source has been fusion energy.

Fusion energy is a type of energy production that occurs when two atomic nuclei fuse together, releasing a large amount of energy in the process. It is considered a potential source of clean and abundant energy, as the fuel for fusion reactions (mainly hydrogen) is abundant on Earth and the reactions produce no greenhouse gases or other harmful pollutants.

There are two main approaches to achieving fusion reactions: inertial confinement fusion (ICF) and magnetic confinement fusion (MCF).

Inertial confinement fusion (ICF) involves using high-energy lasers or particle beams to compress and heat a small pellet of fuel, causing it to fuse. The main advantage of ICF is that it can potentially produce fusion reactions with a relatively small amount of fuel and at a relatively low cost. However, the process is still in the experimental stage and there are significant technical challenges to before it can be considered a practical source of energy.

Magnetic confinement fusion (MCF) involves using strong magnetic fields to contain and heat a plasma (a hot, ionized gas) of hydrogen fuel, causing it to fuse. The most common type of MCF is called tokamak fusion, which uses a toroidal (doughnut-shaped) chamber to contain the plasma. The plasma is held in the center of the chamber by strong magnetic fields, which are created by running current through a set of coil windings around the chamber. The plasma is heated by injecting energy into it, either through particle beams or through electromagnetic waves.

The main advantage of MCF is that it has the potential to produce fusion reactions on a larger scale, making it more suitable for generating electricity. However, it is a more complex and costly process than ICF and there are still significant technical challenges to overcome before it can be considered a practical source of energy.

Both ICF and MCF have made significant progress in recent years and there are several experimental facilities around the world working on these technologies. However, achieving sustained fusion reactions with net energy production (meaning the energy produced by the fusion reactions is greater than the energy required to initiate and sustain the reactions) remains a major technical challenge.

There are also other approaches to fusion energy being explored, such as magnetized target fusion and muon-catalyzed fusion. However, these approaches are still in the early stages of development. It is not yet clear if fusion energy will be viable as a source of energy.

From the above, fusion energy has the potential to be a clean and abundant source of energy, but significant technical challenges must be overcome before it can be considered a practical source of energy.

SUMMARY OF INVENTION

According to the present invention, techniques related generally to fusion energy generation techniques are provided. In particular, the present invention provides a laser system and method for fusion energy, related methods, and more particularly techniques for dumping the laser from a cavity region. Merely by way of example, the invention can be applied to a variety of applications, including energy generation for power, spaceships, travel, other vehicles for air, land, and water, defense applications (e.g., satellite, aerospace, land and missile defense, submarines, boats), biotechnology, chemical, mechanical, electrical, and communication and/or data applications.

In an example, the present invention provides a laser system comprising an optical enhancement cavity ("OEC"). In an example, the optical enhancement cavity has a length and a pair of mirror devices facing each other to define a cavity region. A laser device is coupled to one of the mirror devices to cause propagating of a pulse laser beam between the mirror devices such that the propagating pulse laser beam increases in intensity as the pulse laser beam circulates and resonates within the cavity region. A support structure is coupled to each of the mirror devices to cause the length of the cavity to suspend in a pendulum like structure. A spatial driver device is coupled to an end of the cavity to cause one of the mirror devices to move from a first location to a second location, thereby causing the propagating laser beam to be dumped to an external path from the cavity region.

Of course, one of ordinary skill in the art would recognize other variations, modifications, and alternatives.

Depending upon the example, the present invention can achieve one or more of these benefits and/or advantages. In an example, the present invention provides a fusion energy system including a high intensity pulse or CW laser system configured with a reactor in a compact and spatially efficient system and related methods. In an example, the high intensity pulse or CW laser system provides enough energy to ignite and sustain fusion energy within the reactor. In an example, the present invention offers advantages of generating fusion power through an efficient size, weight, and cost using the present high intensity lasers. In an example, the present system and method is configured to reduce or eliminate parametric instabilities. These and other benefits and/or advantages are achievable with the present device and related methods. Further details of these benefits and/or advantages can be found throughout the present specification and more particularly below.

A further understanding of the nature and advantages of the invention may be realized by reference to the latter portions of the specification and attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE EXAMPLES

Figure 1:
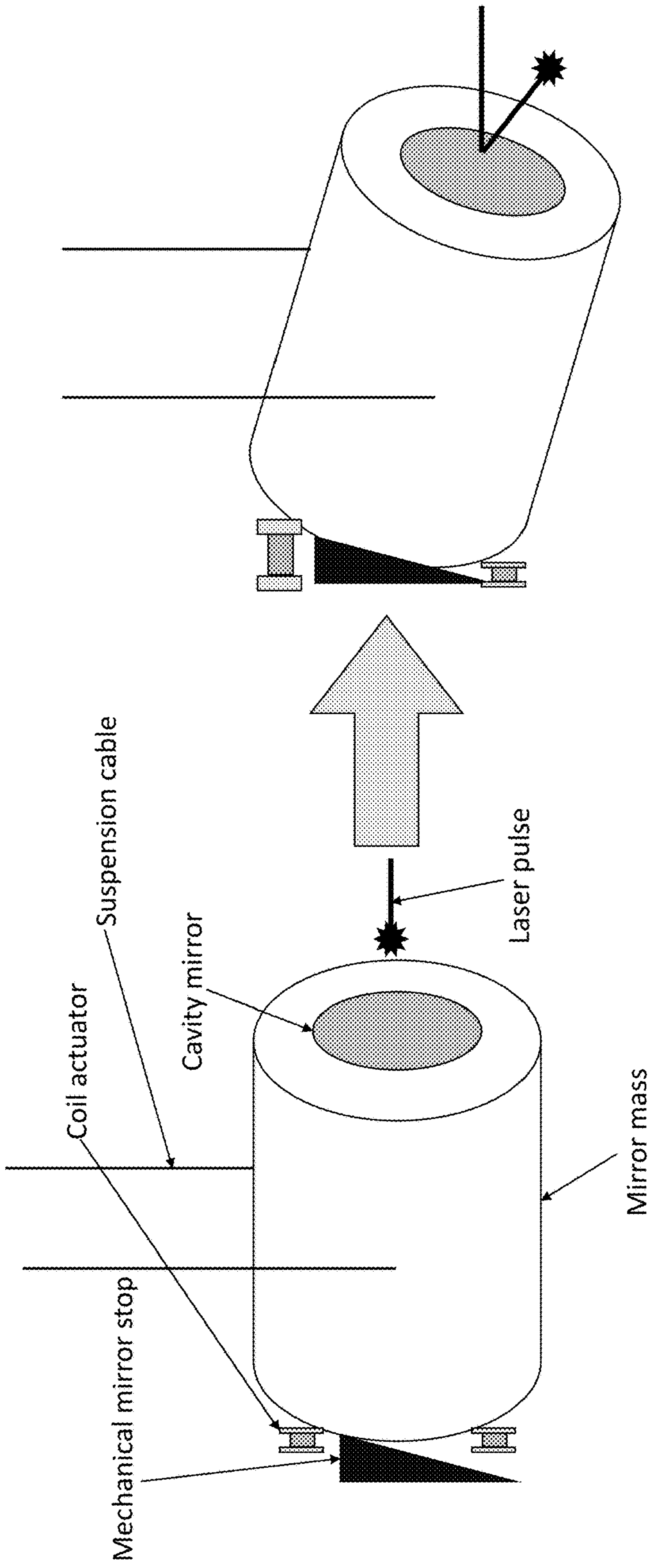
FIG. 1 shows a simplified diagram of a suspended cavity mirror surrounded by a mass holding the cavity mirror and embedded with permanent magnets and surrounded by external coil magnet actuators according to an example of the present invention.

According to the present invention, techniques related generally to fusion energy generation techniques are provided. In particular, the present invention provides a laser system and method for fusion energy, related methods, and more particularly techniques for dumping the laser from a cavity region. Merely by way of example, the invention can be applied to a variety of applications, including energy generation for power, spaceships, travel, other vehicles for air, land, and water, defense applications (e.g., satellite, aerospace, land and missile defense, submarines, boats), biotechnology, chemical, mechanical, electrical, and communication and/or data applications.

The present invention describes a system that allows for the fast removal or "dumping" of stored laser light in a cavity. The laser cavity is formed by two mirrors and includes the free space between them. The laser cavity can be used to amplify an input laser's power. This can be accomplished by controlling the timing and phase of the input laser, such that multiple pulses are injected and then stored in the cavity as a single high energy pulse.

The cavity is composed of two concave or flat mirrors, both suspended at each end of the cavity, and includes the free space between them, as well as the specialized mounts capable of fine adjustment in response to an applied magnetic field. The enhancement cavity, when driven by a pre-amplified laser pulsed at a megahertz repetition rate, creates an increasingly powerful propagating pulse between the cavity mirrors.

The reference interferometer is formed by the same pair of concave or flat mirrors and includes the free space between them along with the mounts capable of fine adjustment of the mirrors. The interferometer is driven by a separate, inexpensive, low power, continuous wave laser, when coupled with a charge coupled device (CCD) camera to measure the interference pattern of the laser beam before and after entering the interferometer cavity. The interferometer serves as an indicator for vibrational noise in the system. These vibrations can be compensated for with an appropriately designed feedback control loop that controls the magnetic actuators. The actuators can adjust the pair of mirrors as needed.

From here on out the cavity driven by the continuous wave laser system will be described as the interferometer cavity or just "interferometer" and the cavity driven by the pulsed laser system will be described as the "enhancement cavity". Both of these cavities can operate at the same time, and their operation is not mutually exclusive, and both operations can be run at the same time using the same pair of mirrors and the free space between them.

To quickly release the energy from the cavity, one of the mirrors must be purposely misaligned so the incoming laser pulse is reflected to the outside of the cavity. This can be achieved by very quickly actuating one of the mirrors after a pulse has reflected off it but before it returns. Using the coil magnet actuators, the mirror can be quickly tilted to be aligned with some form of external steering optic (e.g. a mirror or prism but others are possible) in order to direct the beam outside onto another optical path, releasing energy from the cavity.

The use of a physical stop for the tilted mirror also allows for greater flexibility in the applied current, and alignment of the mirror. A physical stop allows for more reproducibility of the tilt of the mirror. This mechanical reliability reduces the precision required for the magnetic actuators. It also allows the actuators to be driven with a higher current, resulting in faster mirror tilt movement with reduced concern about over-adjustment.

FIG. 1 shows a simplified diagram of a suspended cavity mirror surrounded by a mass holding the cavity mirror and embedded with permanent magnets and surrounded by external coil magnet actuators according to an example of the present invention. The coil magnet actuators are wrapped with copper coils, which when a current is run through the coil magnet actuator device, a magnetic field is generated. Generation of a magnetic field on one side of the cavity mirror results in a displacement of the mirror at an angle theta. Upon reflection of the laser pulse on the displaced mirror, the laser pulse is reflected at an angle theta and escapes the cavity. To prevent the mirror from further displacement, a stopping device is placed surrounding the housing, damping the motion of the cavity mirror. In an example, a first end region is configured with a first mass device to stabilize the first mirror device and a second end region is configured with a second mass device to stabilize the second mirror device.

Figure 2:
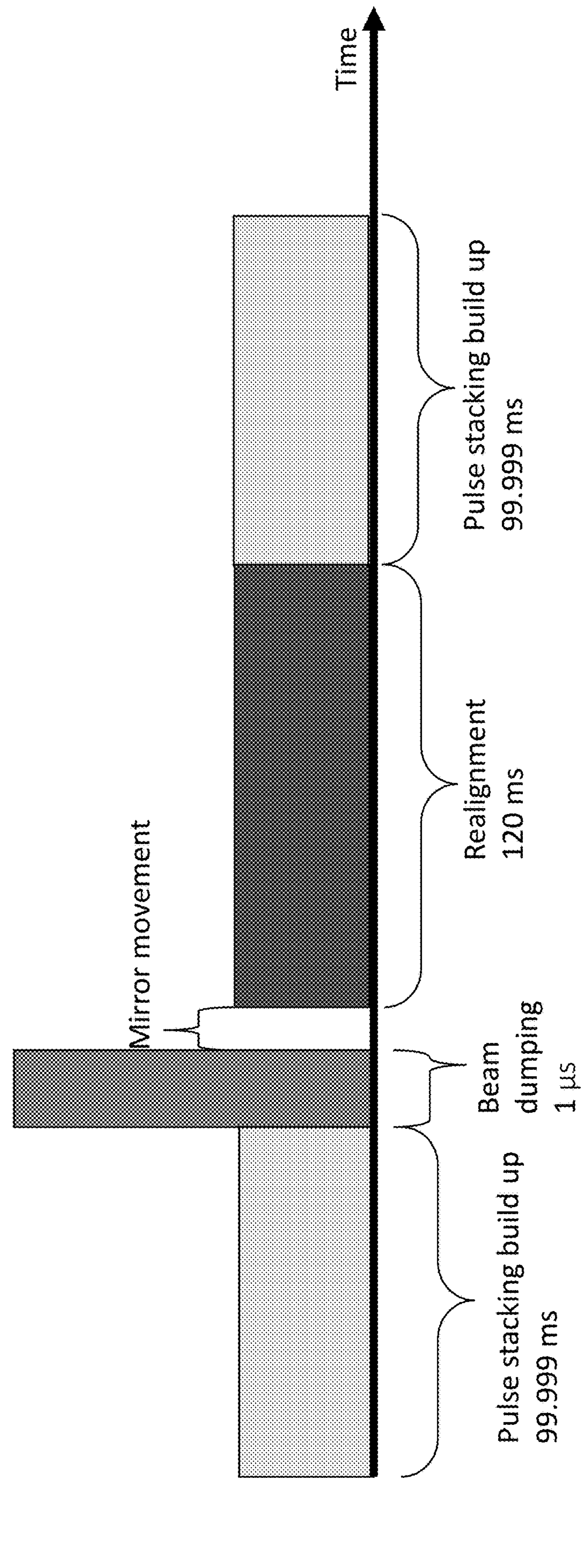
FIG. 2 is a simplified diagram illustrating a timeline of the operations undergone by the cavity and the relative time each operation takes according to an example of the present invention.

FIG. 2 is a simplified diagram illustrating a timeline of the operations undergone by the cavity and the relative time each operation takes according to an example of the present invention. First, the cavity is aligned and a laser pulse is injected at a rate corresponding the to roundtrip time of the cavity, amplifying the laser pulse in the cavity from a lower energy level M to a higher energy level N, resulting in pulse stacking build up. In an example, the pulse stacking build occurs for 99.999 ms, but can be any time depending on the desired higher energy level N. Upon reaching the higher energy level, the cavity mirror is displaced in 1 μs and the higher energy level laser pulse is ejected from the cavity. The cavity is then realigned to correct for the cavity mirror displacement for 120 ms, and the process is repeated.

Figure 3:
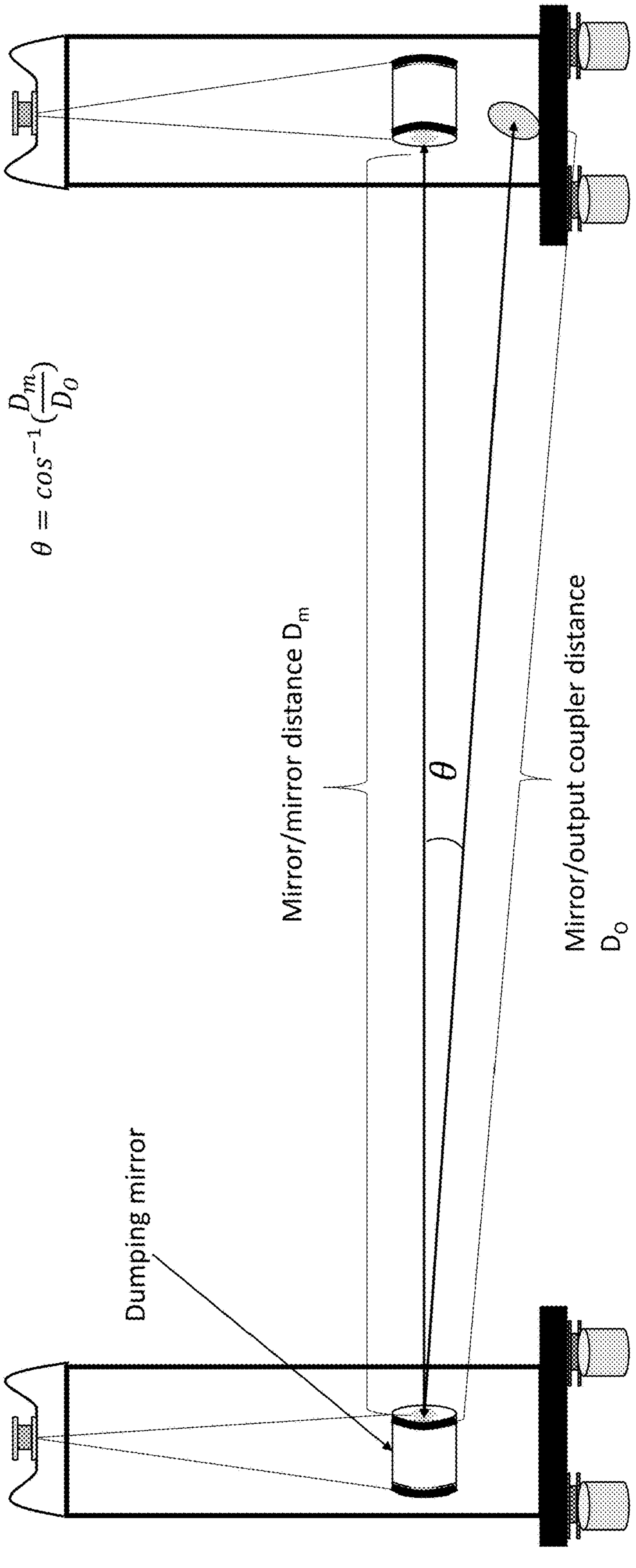
FIG. 3 is a simplified diagram demonstrating the displacement of the high energy laser pulse outside of the suspended optical enhancement cavity after displacement of the suspended cavity mirror in the first region according to an example of the present invention.

FIG. 3 is a simplified diagram demonstrating the displacement of the high energy laser pulse outside of the suspended optical enhancement cavity after displacement of the suspended cavity mirror in the first region according to an example of the present invention. The angle of displacement, θ, necessary for the high energy laser pulse to escape the cavity is determined by the length of the cavity and the diameter of the cavity mirror. Upon displacement of the suspended cavity mirror in the first mirror, the high energy laser pulse is reflected at an angle θ and coupled to an output coupler device such as an aperture, hole, window, or mirror, but could be others. The amount of force necessary to displace the suspended cavity mirror in the first region is less than a rigid cavity mirror.

Figure 4:
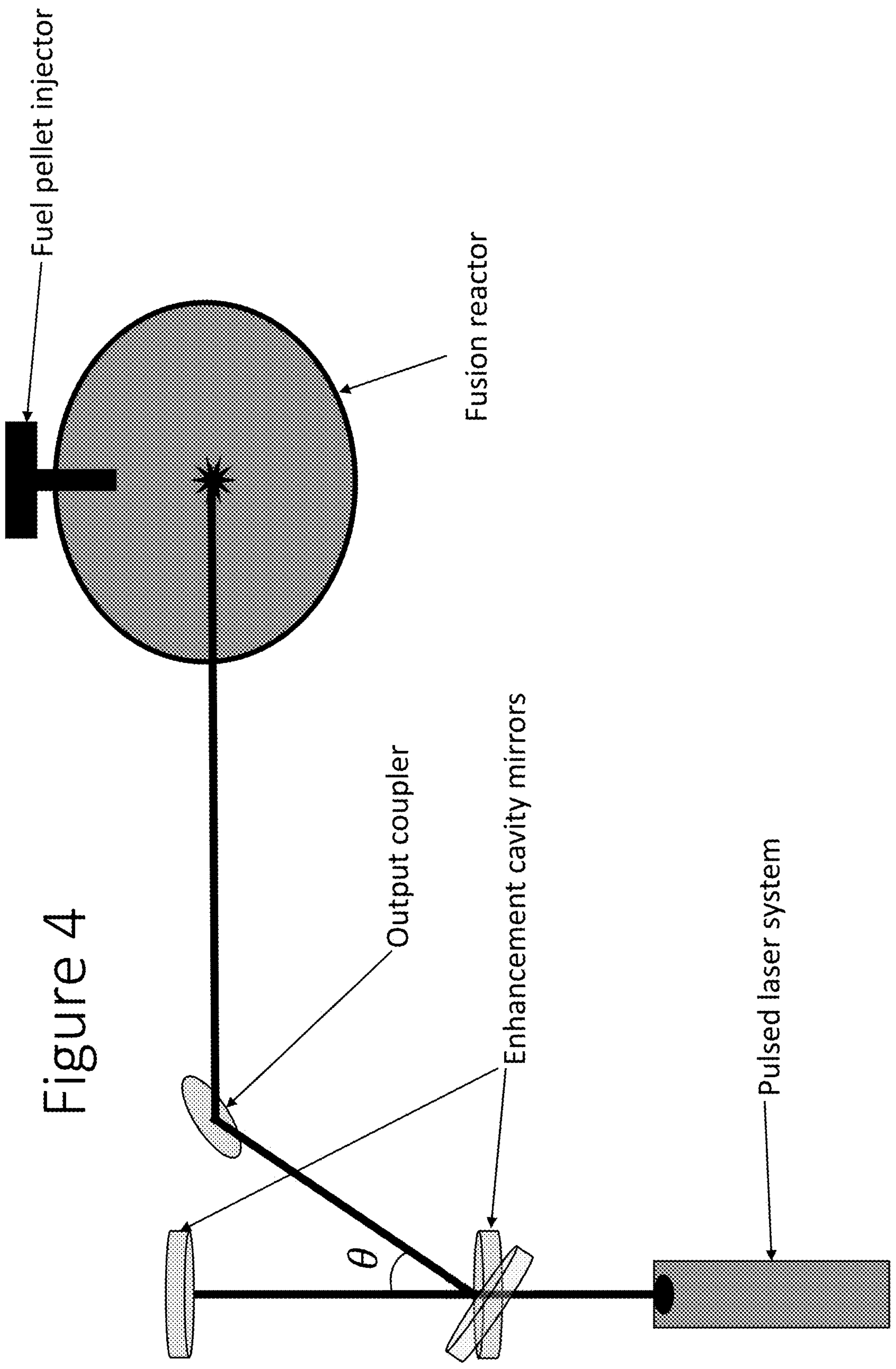
FIG. 4 is a simplified diagram showing a displacement system to dump a high energy laser pulse from a suspended optical enhancement cavity, which is then injected in a fusion reactor system according to an example of the present invention.

FIG. 4 is a simplified diagram showing a displacement method to dump a high energy laser pulse from a suspended optical enhancement cavity, which is then injected in a fusion reactor system according to an example of the present invention. A high energy laser pulse is first generated in a suspended optical enhancement cavity. Upon amplification to a higher energy level, a cavity mirror in the first region is displaced by an angle θ, which upon reflection of a high energy laser pulse on the cavity mirror in the first region, results in a displacement in the beam path of the high energy laser pulse. The displaced high energy laser pulse is coupled to an output coupler, which receives the high energy laser pulse and redirects the high energy laser pulse into the fusion reactor for energy production.

Figure 5A:
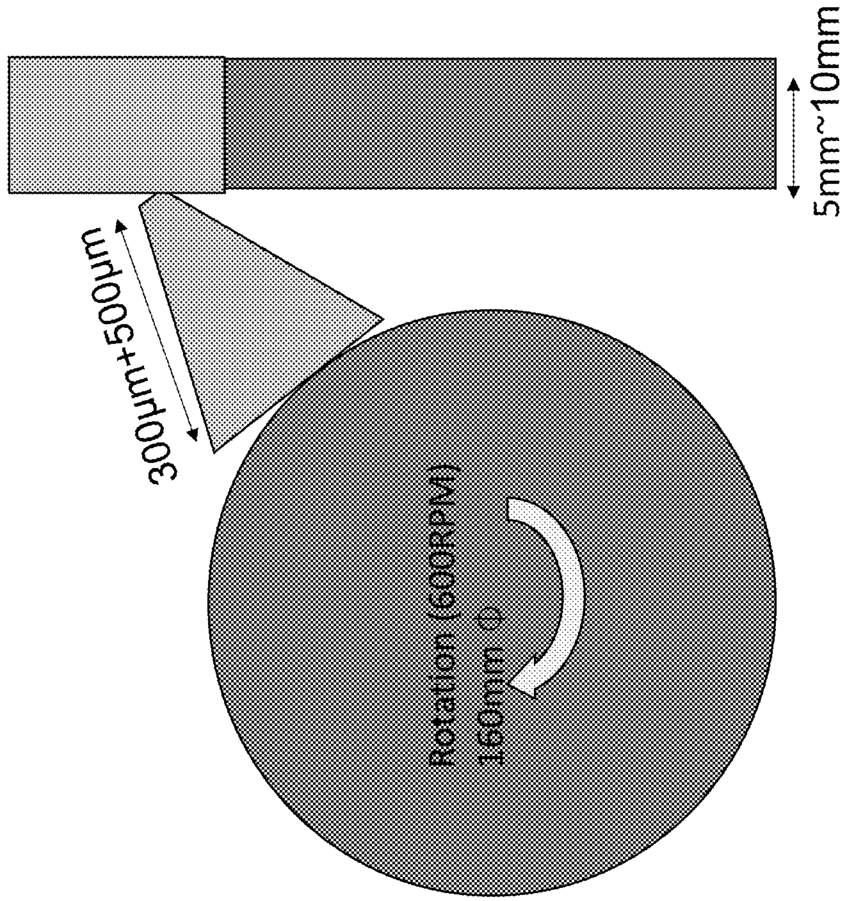
FIG. 5A is a simplified diagram showing a rotating device comprised of a wheel capable of rotating at a high repetition rate and a mesa shaped protrusion that can physically adjust a suspended cavity mirror according to an example of the present invention.

FIG. 5A is a simplified diagram showing a rotating device comprised of a wheel capable of rotating at a high repetition rate and a mesa shaped protrusion that can physically adjust a suspended cavity mirror according to an example of the present invention. The wheel is rotated at a speed such that the rate at which the mesa shaped protrusion strikes the back region of a suspended cavity mirror matches the rate of cavity at a frequency between 1 and 100 Hz, but could be others with magnetic coil actuators mentioned in FIGS. 1-4. The collision of the mesa shaped protrusion produces a force between the mesa shaped protrusion and a suspended cavity mirror, displacing a suspended cavity mirror from a position L to a position O.

Figure 5B:
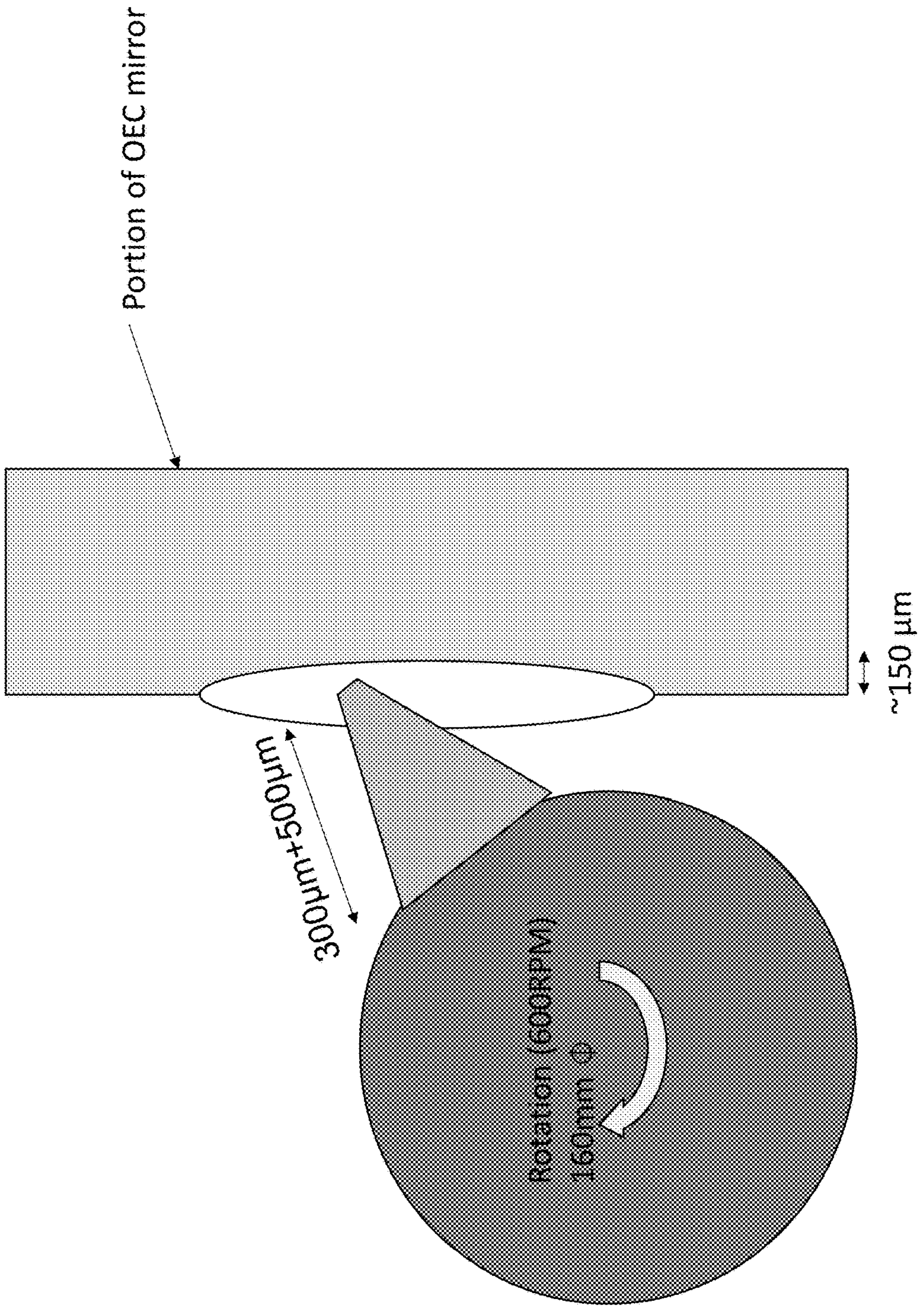
FIG. 5B is a simplified diagram showing a rotating device comprised of a wheel capable of rotating at a high repetition rate and a mesa shaped protrusion that can physically adjust a suspended cavity mirror (concave region) according to an example of the present invention.

FIG. 5B is a simplified diagram showing a rotating device comprised of a wheel capable of rotating at a high repetition rate and a mesa shaped protrusion that can physically adjust a suspended cavity mirror (concave region) according to an example of the present invention. In an example, the wheel is rotated at a speed such that the rate at which the mesa shaped protrusion strikes the back region of a suspended cavity mirror matches the rate of cavity at a frequency between 1 and 100 Hz, but could be others with magnetic coil actuators mentioned in FIGS. 1-4. The collision of the mesa shaped protrusion produces a force between the mesa shaped protrusion and a suspended cavity mirror, displacing a suspended cavity mirror from a position L to a position O. In an example, the backside of the mirror device is configured with a recessed region, which mechanically guides, and more smoothly couples with the mesa shaped protrusion, resulting in motion in only a single axis and dampening motion in other directional axes. That is, the recessed region acts as the mechanical guide.

Figure 6:
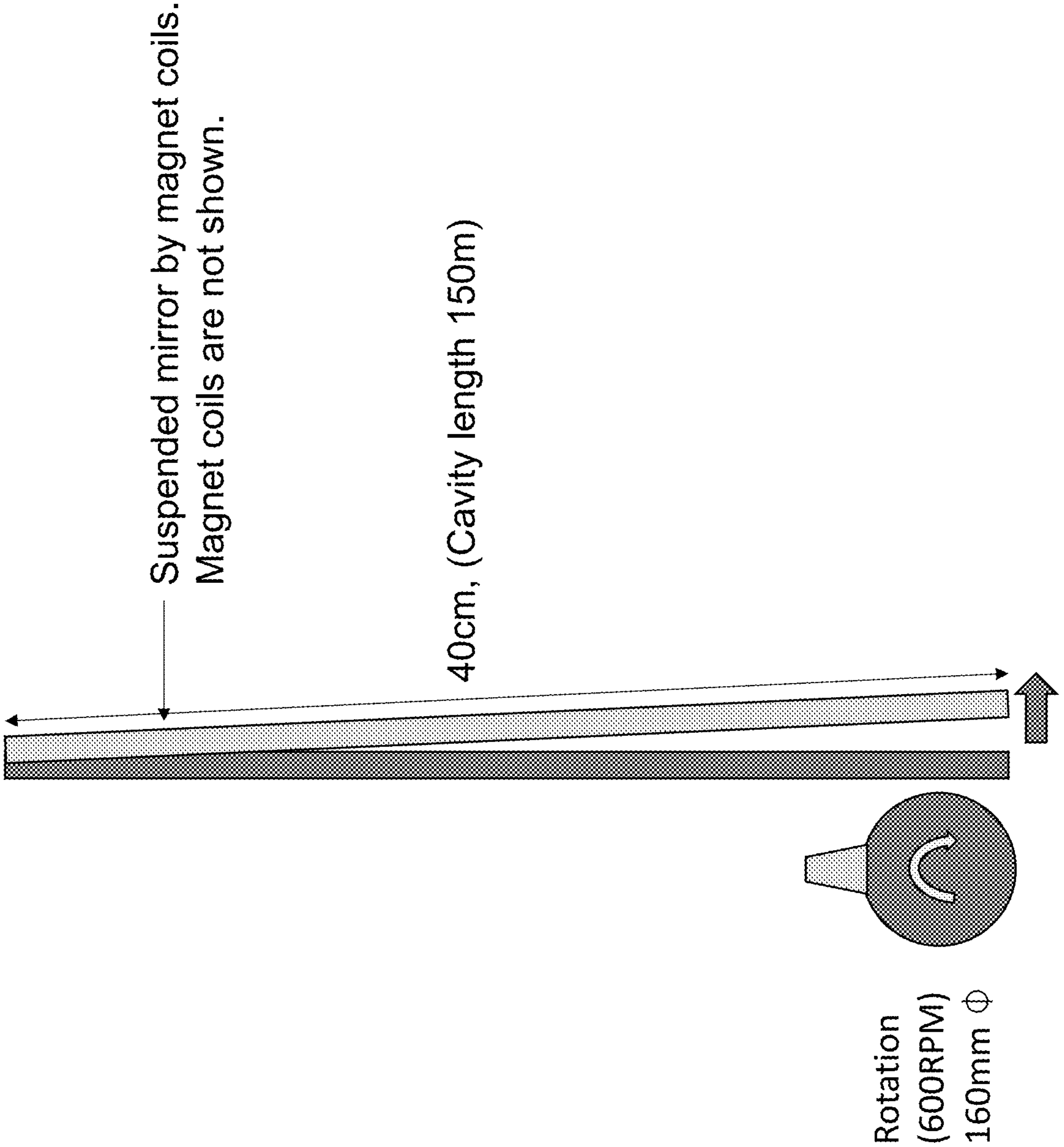
FIG. 6 is a simplified diagram showing a system to physically displace a suspended cavity mirror through collision of a mesa shaped protrusion with the back side of a suspended cavity mirror according to an example of the present invention.

FIG. 6 is a simplified diagram showing a method to physically displace a suspended cavity mirror through collision of a mesa shaped protrusion with the back side of a suspended cavity mirror. The spinning wheel is positioned behind the suspended cavity mirror to allow for a collision between the mesa shaped protrusion and the back region of the suspended cavity mirror. Upon collision between the mesa shaped protrusion and the back region of a suspended cavity mirror, a force is applied to a suspended cavity mirror resulting in a displacement of the cavity mirror. A high energy laser pulse circulating in the suspended optical enhancement cavity is then coupled to the displaced suspended cavity mirror resulting in a reflection and displacement of the cavity mirror outside of the suspended optical enhancement cavity. After the collision between the mesa shaped protrusion and the suspended cavity mirror, the suspended cavity mirror is returned to its position before the collision by magnetic coil actuators mentioned in FIGS. 1-4.

Figure 7:
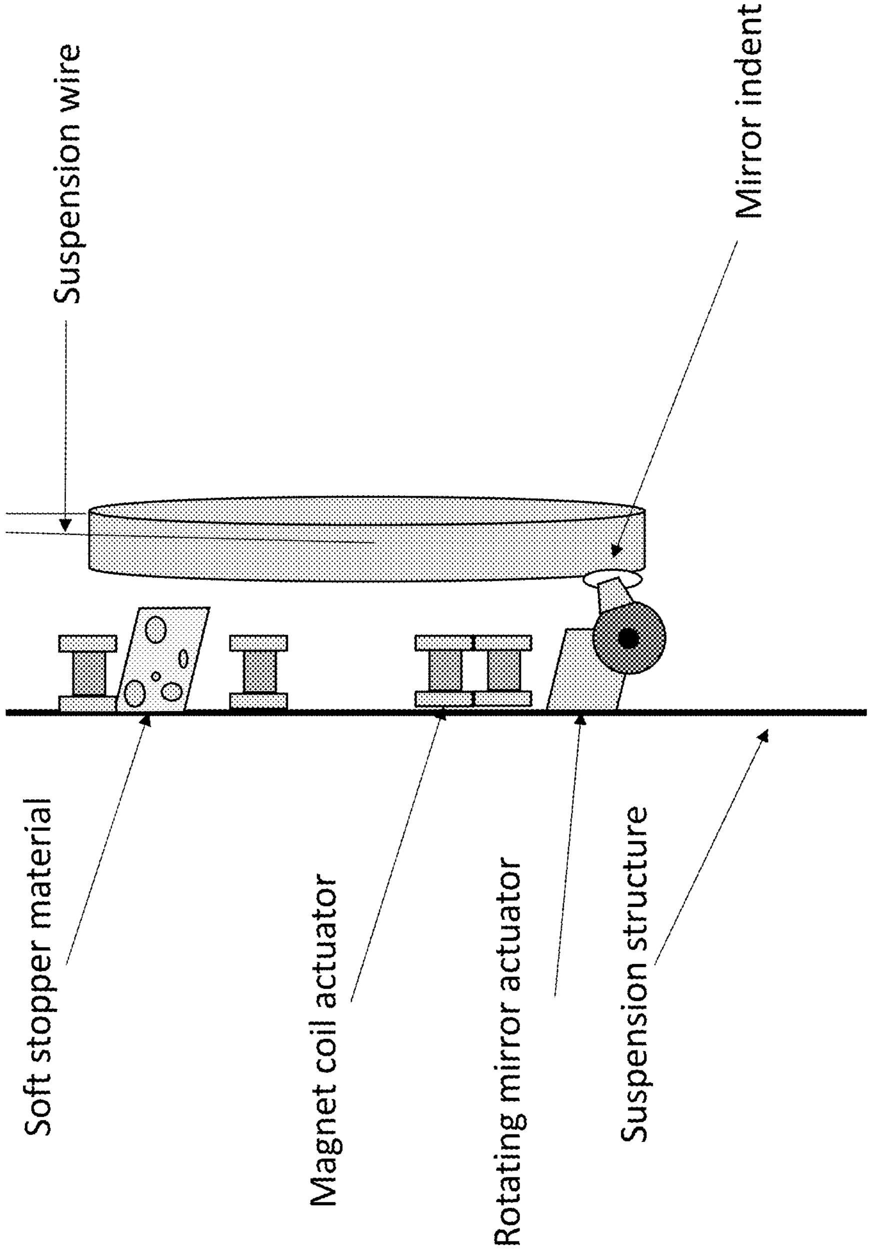
FIG. 7 is a more detailed side view diagram of a system including a stopper, spatial drive device, and support devices according to an example of the present invention.

FIG. 7 is a more detailed side view diagram of a system including a stopper, spatial drive device, and support devices according to an example of the present invention. In an example, a cavity mirror (e.g., mirror device) is suspended and its position is controlled and maintained by positioning magnet coil actuators surrounding the cavity mirror. Upon alignment of the cavity mirror in the first region with a cavity mirror (e.g., mirror device) in the second region, a laser pulse circulating between the two cavity mirrors is amplified from a lower energy level M to a higher energy level N, as the laser pulse propagates between the pair of mirror devices. Concurrently, a rotating mirror actuator (e.g., spatial driver device) coupled to a mesa shaped protrusion is rotating at a high speed or other desired frequency, which is consistent or patterned or other desirable cycle. Upon amplification to energy level N, the mesa shaped protrusion on a rotating mirror actuator is timed to make contact with a cavity mirror in a mirror indent region applying a force to the back side of a cavity mirror and changing the position of the cavity mirror from position O to position P, where O and P represent a value. In an example, a soft stopper material is placed behind and in the top region of a cavity mirror dampening the mirror's motion to prevent the cavity mirror from moving further than position P. A high energy laser pulse upon reflection by a cavity mirror moved to position P is reflected out of the circulating cavity. In an example, the high energy laser pulse, which cycles within the cavity, is dumped outside of the cavity at a predetermined angle or other spatial feature.

Figure 8:
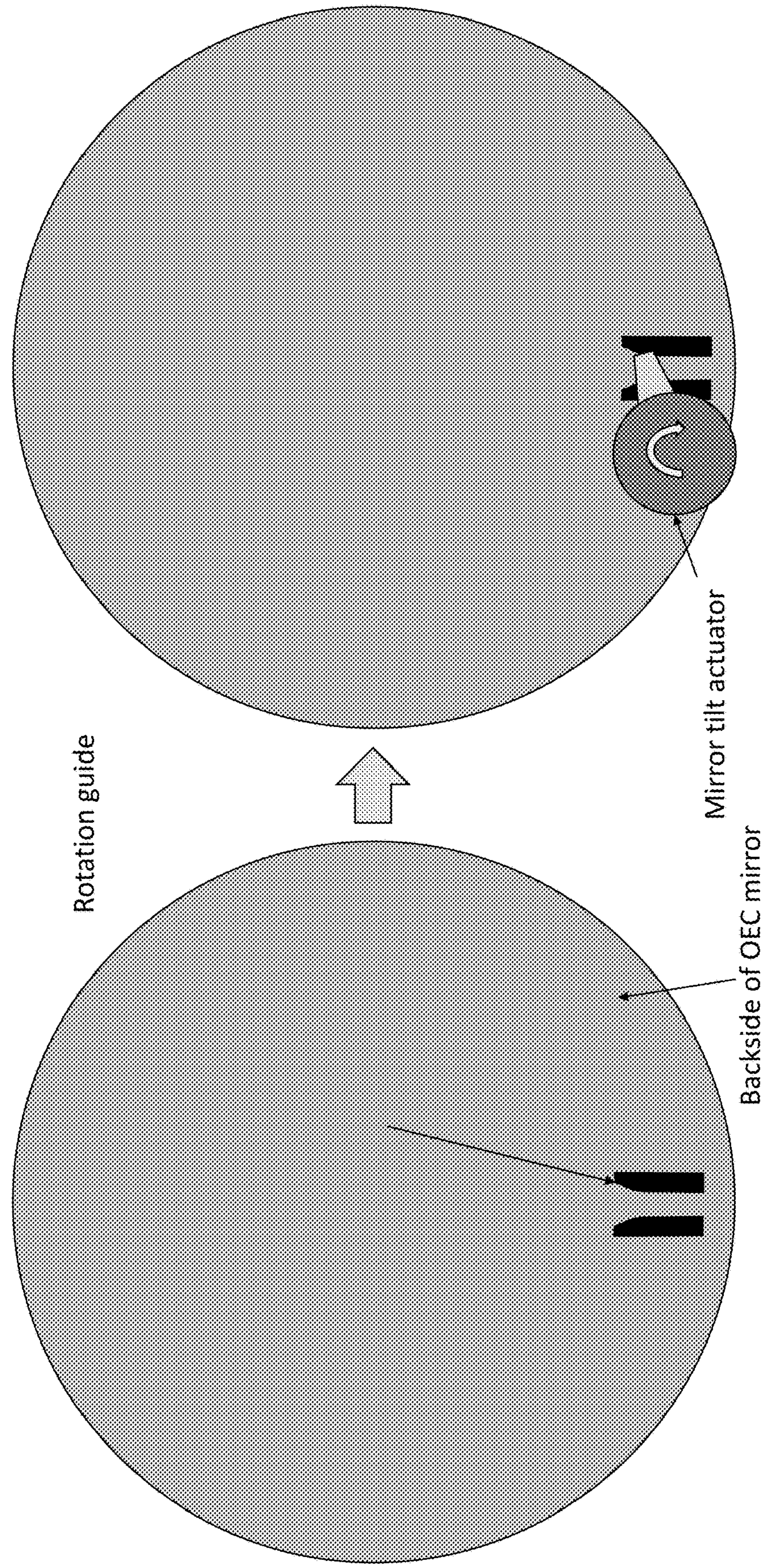
FIG. 8 is a simplified diagram illustrating a backside of a mirror device configured with a wheel capable of rotation according to an example of the present invention.

FIG. 8 is a simplified diagram illustrating a backside of a mirror device configured with a wheel capable of rotation according to an example of the present invention. In an example, a wheel is coupled to a mesa shaped protrusion and is configured to rotate at high speeds or other desirable motion and pattern. In an example, a rotation guide is placed in a bottom region of a cavity mirror where the mesa shaped protrusion makes contact with the cavity mirror promoting motion in a single axis and dampening motion in any other axis of motion.

Figure 9:
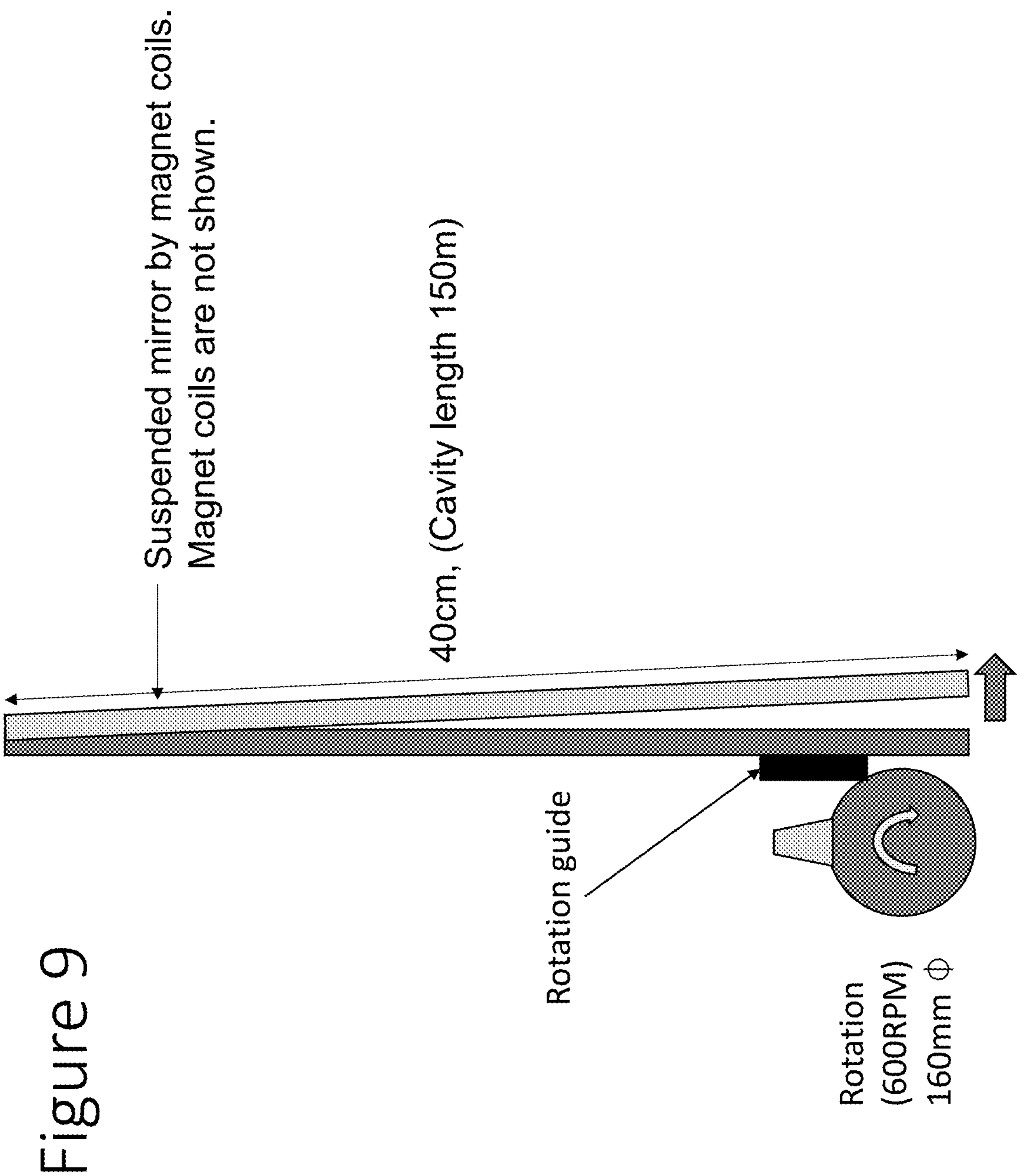
FIG. 9 is a simplified diagram showing a system to physically displace a suspended cavity mirror through collision of a mesa shaped protrusion coupled with a rotation guide with the back side of a suspended cavity mirror according to an example of the present invention.

FIG. 9 is a simplified diagram showing a system to physically displace a suspended cavity mirror through collision of a mesa shaped protrusion coupled with a rotation guide with the back side of a suspended cavity mirror according to an example of the present invention. In an example, a wheel is coupled to a mesa shaped protrusion and is configured to rotate at high speeds or other desirable speed and/or pattern. A rotation guide is placed in a bottom region of a cavity mirror where the mesa shaped protrusion makes contact with the cavity mirror promoting motion in a single axis and dampening motion in any other axis of motion.

Figure 10:
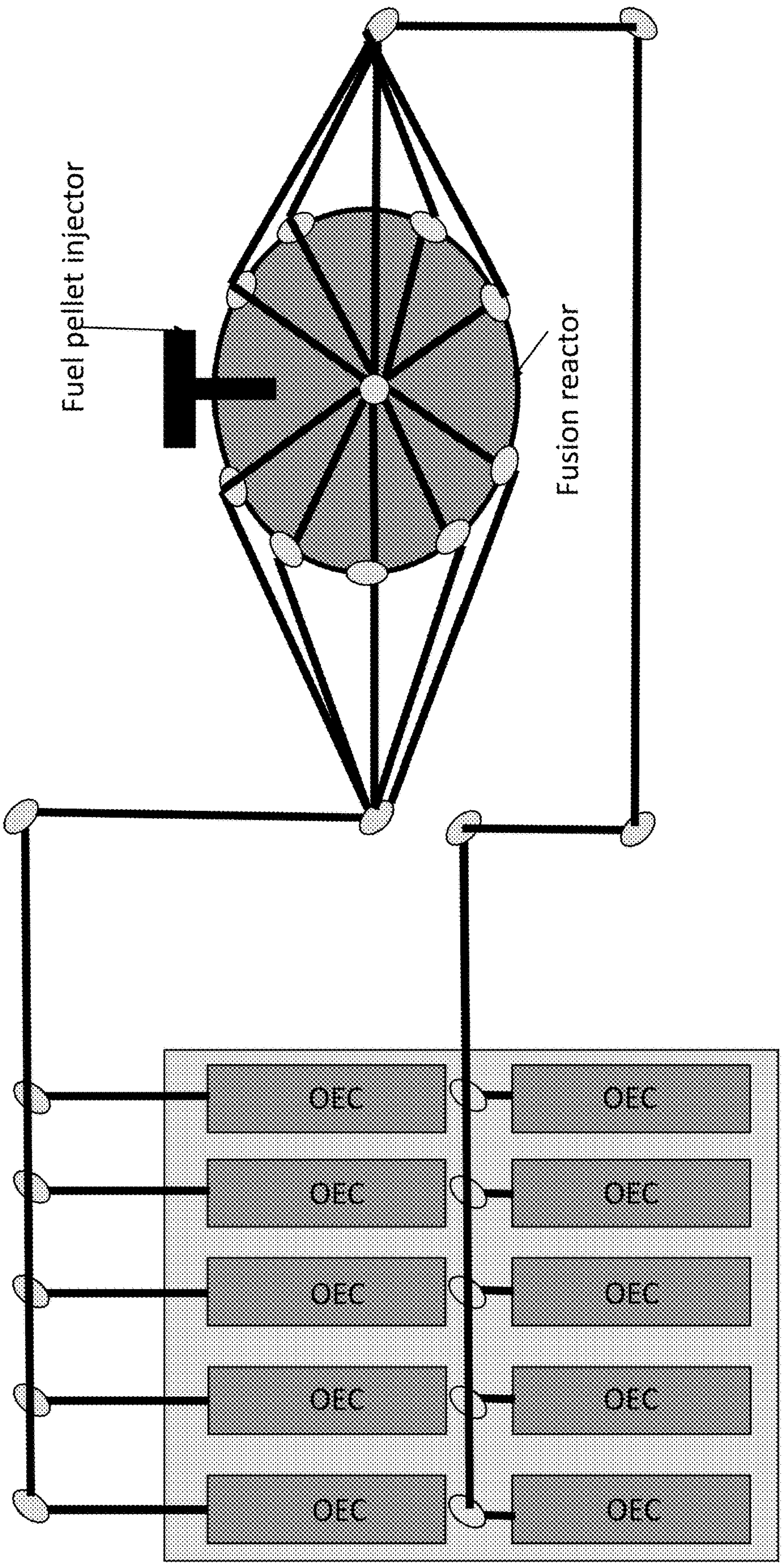
FIG. 10 is a simplified diagram illustrating a fusion reactor configured with a plurality of optical enhancement cavities according to an example of the present invention.

FIG. 10 is a simplified diagram illustrating a fusion reactor configured with a plurality of optical enhancement cavities according to an example of the present invention. As shown is a nuclear fusion system. The system has a fusion reaction chamber comprising an interior region, which has a reaction region. The system has a plurality of optical enhancement cavities numbered from 1 to N, where N is an integer of 2 and greater. Each cavity is coupled to a source laser that injects laser pulses into each cavity at a rate corresponding to time for an intracavity laser to travel in the cavity, resulting in amplification from a lower energy level S to a higher energy level T, where S and T are values. Upon reaching a higher energy level T, each cavity dumps the higher energy laser pulse and is redirected towards a fusion reaction chamber. The timing of dumping of each OEC is configured so that each laser pulse reaches the center of a fusion reaction chamber at the same time. Upon reaching the outer wall of a fusion reaction chamber, each high energy laser pulse is focused so that each high energy laser pulse reaches the apex of their focus at the furoin reaction chamber center. A fusion pellet injector is configured to a fusion reaction chamber and injects a fusion fuel pellet and timed so that each focused high energy laser pulse evenly irradiates and ignites the fusion fuel pellet.

In an example, each of the optical enhancement cavities has a first mirror device having a first face and configured on a first end region, e.g., housing, mass device, housing and mass. Each of the cavities has a second mirror device having a second face, the second face opposing the first face. The second mirror device is configured on a second end region, e.g., housing, mass device, housing and mass. Each of the cavities has a cavity region defined between the first face and the second face. A laser device is operably coupled to at least one mirror device and configured to generate a laser pulse propagating between the first face and the second face to collectively combine to increase in energy intensity from a first intensity to a second intensity to an Mth intensity for M cycles, where M is greater than 1,000 cycles at the cavity region.

In an example, a first support member is configured to support the first end region and a second support member configured to support the second end region such that the optical enhancement cavity is suspended from the first support member and the second support member and a bottom region between the first end region and the second end region is free from a support. In an example, at least one spatial driver device configured to one of the mirror devices to move a spatial region of the mirror device to cause the pulse laser beam to a beam path from a first direction to a second direction, the second direction is at an angle from the first direction, e.g., angle ranging from 0.1 Degree to 10 Degrees.

In an example, the system has a plurality of steering mirror devices numbered from 1 to N. In an example, the plurality of steering mirrors are, respectively, coupled to the plurality of optical enhancement cavities. Each of the steering mirror devices being configured to receive the pulse laser beam from the second direction and configured to direct the pulse laser beam in a direction to be focused. An example of the steering mirror device is a suitable high reflectivity mirror device, among others.

In an example, the system has a plurality of focusing optics numbered from 1 to N. In an example, the plurality of focusing optics are, respectively, operably coupled to the plurality of steering mirrors. Each of the focusing optics is configured to focus the pulse laser beam to be directed to the reaction region.

In an example, the system has a fuel target injected into the reaction region and spatially placed to receive each of the plurality of pulse laser beams to cause nuclear ignition of the fuel target.

In an example, the fusion reaction chamber is maintained in a vacuum environment. In an example, each of the first mirror device and the second mirror device is characterized by a mirror reflectivity, e.g., 99.999% and greater. In an example, the spatial driver device comprises an actuator device.

In an example, the present laser system includes one or more elements. The system has an optical enhancement cavity (OEC) characterized by a length and configured with a pair of mirror devices on each side of the optical enhancement cavity. In an example, the length can be greater than one meter to 1000 meters, or longer or shorter. In an example, the optical enhancement cavity comprises a first end region within a vicinity of a first mirror device from the pair of mirrors and a second end region within a vicinity of a second mirror device from the pair of mirrors. In an example, at least one laser device is coupled to at least one of the mirror devices to generate a propagating laser beam between the pair of mirror devices to form the optical enhancement cavity. In an example, the system has a first support device configured above a first reference ground level. The system is isolated from one or more seismic vibrations from a ground level. In an example, the first support device comprises a first hanger member (e.g., cable, rigid member, flexible member) coupled to suspend the first end region. In an example, the system has a second support device configured with the first support structure. The second support device is configured above a second reference ground level such that the system is isolated from one or more seismic vibrations from the ground level. In an example, the first reference ground level is separated by a distance from the second reference ground level. In an example, the second support device comprises a second hanger member (e.g., cable, rigid member, flexible member) coupled to suspend the second end region such that length of the optical enhancement cavity remains suspended above the first reference ground level and the second reference ground level.

In an alternative example, the present invention provides an alternative laser system. The laser has an optical enhancement cavity comprising a first mirror device opposed to a second mirror device to form a cavity region. In an example, the cavity region is characterized by a length between a first face of the first mirror device and a second face of a second mirror device. In an example, the system has at least one laser device (e.g., pulse laser device) configured to emit a pulse laser beam into the cavity region to propagate between the first mirror device and the second mirror device and configured to cause the pulse laser beam to resonate within the cavity region. In an example, the system has a continuous wave laser device configured to emit a continuous wave laser beam into the cavity region to propagate between the first mirror device and the second mirror device.

In an example, the present invention provides a method of operating a laser system. In an optical enhancement cavity configured between a first mirror device and a second mirror device, and a length defined between the first mirror device and the second mirror device, the optical enhancement cavity having a first end region within a vicinity of the first mirror device and a second end region within a vicinity of the second mirror device, the method outputs a pulse laser beam from a laser device coupled to the optical enhancement cavity to propagate the pulse laser beam between the first mirror device and the second mirror device within a cavity region to increase an intensity of the pulse laser beam from a first intensity to an Nth intensity, as the pulse laser beam cycles between the first mirror device and the second mirror device, where N is a multiple of the first intensity. In an example, the method includes using a first support member configured to support the first end region and a second support member configured to support the second end region such that the optical enhancement cavity is suspended from the first support member and the second support member and a bottom region between the first end region and the second end region is free from a support. In an example, the method includes using a spatial driver device configured to one of the mirror devices to move a spatial region of the mirror device to cause the pulse laser beam at the Nth intensity within the cavity region to a change beam path from a first direction to a second direction to cause the pulse laser beam to exit the cavity region.

In an example, the pulse laser beam at the Nth intensity is an amplified pulse laser beam.

In an example, the laser system is described in a patent application titled "SUSPENSION COUPLING OPTICAL ENHANCEMENT CAVITY FOR FUSION", listed under U.S. Ser. No. 18/431,769 filed Feb. 2, 2024, which is commonly owned, and hereby incorporated by reference in its entirety.

In an example, additional details of an optical enhancement cavity using the Fabry Perot cavity is found in a patent application titled "A FAST IGNITION FUSION SYSTEM AND METHOD," in the names of Shuji Nakamura and Hiroaki Ohta listed under U.S. Ser. No. 18/319,368 filed May 17, 2023, commonly assigned, and hereby incorporated by reference in their entirety.

While the above is a full description of the specific examples, various modifications, alternative constructions, and equivalents may be used. As an example, the present system, method, and device can include any combination of elements described above, as well as outside of the present specification. In an example, the high intensity laser forms a resonator between the pair of mirror devices using constructive interference of each of the laser beams. In an example, the first path with the high intensity pulse laser is provided in a resonator device. In an example, the present invention provides a system and method to generate a concentric or spherical resonator within a reaction region to focus laser light at a center of the reactor. Additionally, the terms first, second, third, and final do not imply order in one or more of the present examples. Therefore, the above description and illustrations should not be taken as limiting the scope of the present invention which is defined by the appended claims.

The invention claimed is:

1. A laser system, the system comprising:

an optical enhancement cavity configured between a first mirror device and a second mirror device, and a length defined between the first mirror device and the second mirror device, the optical enhancement cavity having a first end region within a vicinity of the first mirror device and a second end region within a vicinity of the second mirror device;

a laser device coupled to the optical enhancement cavity to output a pulse laser beam to be propagated between the first mirror device and the second mirror device;

a chamber configured to enclose the optical enhancement cavity under vacuum;

a first support member configured to support the first end region and a second support member configured to support the second end region such that the optical enhancement cavity is suspended from the first support member and the second support member and a bottom region between the first end region and the second end region is free from a support;

at least one spatial driver device configured to one of the mirror devices to move a spatial region of the mirror device to cause the pulse laser beam to a beam path from a first direction to a second direction, the second direction is at an angle from the first direction, the angle ranging from 0.1 Degree to 10 Degrees.

2. The system of claim 1 further comprising an exit region including a window, aperture, mirror, saturable absorber region configured within a portion of the chamber within a vicinity of the mirror devices and configured to output the pulse laser beam in the second direction.

3. The system of claim 1 further comprising a drive device coupled to the spatial driver device, the drive device configured to supply an electrical signal to the spatial driver device to cause the mirror device to move from a first location to a second location.

4. The system of claim 1 wherein the spatial driver device comprises a coil magnet actual device; wherein the first end region is configured with a first mass device to stabilize the first mirror device and the second end region is configured with a second mass device to stabilize the second mirror device.

5. The system of claim 1 wherein the spatial drive device comprises a rotating actuator device characterized by a movement to cause the mirror device to move from a first location to a second location at the same rate as the duty cycle of the fusion reactor.

6. The system of claim 1 wherein the spatial driver device is characterized by a reproduceable motion to repeated move the mirror device from a first location to a second location.

7. The system of claim 1 wherein the spatial driver device is configured to tilt the mirror device while the optical enhancement cavity is suspended.

8. The system of claim 1 further comprising a reactor housing coupled to the optical enhancement cavity, the optical enhancement cavity configured to direct the pulse laser beam in the second direction to a region within the reactor housing.

9. The system of claim 1 further comprising a stop region, the stop region configured to one of the first end region or second end region to prevent movement of one of the mirror devices beyond a location of the stop region.

10. The system of claim 9 wherein the stop region comprises a mechanical stop structure.

11. The system of claim 1 wherein the pulse laser beam propagating in the optical enhancement chamber increases in intensity during a burst mode occurring within a predetermined time period.

12. The system of claim 11 wherein the optical enhancement cavity including the first mirror and second mirror is realigned to begin propagating a second laser pulse between the first mirror and second mirror along the beam path in the first direction.

13. The system of claim 12 further comprising a controller system configured to a reference signal to cause the first mirror and second mirror to realign.

14. The system of claim 1 further comprising a reactor housing coupled to the optical enhancement cavity, the optical enhancement cavity configured to direct the pulse laser beam in the second direction to a region within the reactor housing such that the laser pulse is configured to ignite a fuel target in the reactor housing, while maintaining the optical enhancement cavity free from any debris from the fuel target.

15. A nuclear fusion system, the system comprising:

a fusion reaction chamber comprising an interior region, the interior region comprising a reaction region;

a plurality of optical enhancement cavities numbered from 1 to N, where N is an integer of 2 and greater, each of the optical enhancement cavities comprising:

a first mirror device having a first face, and configured on a first end region;

a second mirror device having a second face, the second face opposing the first face, the second mirror device configured on a second end region;

a cavity region defined between the first face and the second face;

a laser device operably coupled to at least one mirror device and configured to generate a laser pulse propagating between the first face and the second face to collectively combine to increase in energy intensity from a first intensity to a second intensity to an Mth intensity for M cycles, where M is greater than 1,000 cycles at the cavity region;

a first support member configured to support the first end region and a second support member configured to support the second end region such that the optical enhancement cavity is suspended from the first support member and the second support member and a bottom region between the first end region and the second end region is free from a support;

at least one spatial driver device configured to one of the mirror devices to move a spatial region of the mirror device to cause the pulse laser beam to a beam path from a first direction to a second direction, the second direction is at an angle from the first direction, the angle ranging from 0.1 Degree to 10 Degrees;

a plurality of steering mirror devices numbered from 1 to N, the plurality of steering mirrors, respectively, coupled to the plurality of optical enhancement cavities, each of the steering mirror devices being configured to receive the pulse laser beam from the second direction and configured to direct the pulse laser beam in a direction to be focused; and a plurality of focusing optics numbered from 1 to N, the plurality of focusing optics, respectively, operably coupled to the plurality of steering mirrors, each of the steering mirrors being configured to focus the pulse laser beam to be directed to the reaction region;

a fuel target injected into the reaction region and spatially placed to receive each of the plurality of pulse laser beams to cause nuclear ignition of the fuel target.

16. The system of claim 15 wherein the fusion reaction chamber is maintained in a vacuum environment.

* * * * *